United States Patent [19]
Schwab

[11] Patent Number: 5,973,731
[45] Date of Patent: *Oct. 26, 1999

[54] SECURE IDENTIFICATION SYSTEM

[76] Inventor: Barry H. Schwab, 5298 Cedarhurst, West Bloomfield, Mich. 48322

[ * ] Notice: This patent issued on a continued prosecution application filed under 37 CFR 1.53(d), and is subject to the twenty year patent term provisions of 35 U.S.C. 154(a)(2).

[21] Appl. No.: 08/453,393

[22] Filed: May 30, 1995

Related U.S. Application Data

[63] Continuation-in-part of application No. 08/205,885, Mar. 3, 1994, abandoned, application No. 08/393,493, Feb. 24, 1995, abandoned, and application No. 08/410,318, Mar. 24, 1995, abandoned.

[51] Int. Cl.$^6$ ........................................................ H04N 7/18
[52] U.S. Cl. .................. 348/161; 235/380; 340/825.44; 380/23; 382/116
[58] Field of Search .................................... 348/129, 130, 348/143, 156, 161; 382/115, 116, 118, 119; 380/23, 30; 340/825.31, 825.34; 235/380; H04N 7/18

[56] References Cited

U.S. PATENT DOCUMENTS

| | | | |
|---|---|---|---|
| 4,253,086 | 2/1981 | Szwarcier | 340/146 |
| 4,529,870 | 7/1985 | Chaum | 235/380 |
| 4,663,518 | 5/1987 | Borret et al. | 235/487 |
| 4,773,677 | 9/1988 | Plasse | 283/77 |
| 4,811,408 | 3/1989 | Goldman | 382/2 |
| 4,821,118 | 4/1989 | Lafreniere | 358/108 |
| 4,921,278 | 5/1990 | Shiang et al. | 283/87 |
| 4,972,476 | 11/1990 | Nathan | 380/23 |
| 4,993,068 | 2/1991 | Piosenka et al. | 380/23 |
| 5,095,196 | 3/1992 | Miyata | 235/382 |
| 5,144,680 | 9/1992 | Kobayashi | 382/4 |
| 5,228,094 | 7/1993 | Villa | 382/4 |
| 5,306,049 | 4/1994 | Schireck | 283/74 |
| 5,319,724 | 6/1994 | Blonstein et al. | 382/56 |
| 5,321,751 | 6/1994 | Ray et al. | 380/23 |
| 5,339,361 | 8/1994 | Schwalm et al. | 380/23 |
| 5,467,403 | 11/1995 | Fishbine et al. | 382/116 |
| 5,521,984 | 5/1996 | Denenberg et al. | 382/209 |

FOREIGN PATENT DOCUMENTS 0247788   12/1987   European Pat. Off. .

*Primary Examiner*—Wendy Garber
*Assistant Examiner*—Vincent F. Boccio
*Attorney, Agent, or Firm*—Weintraub & Brady, P.C.

[57] ABSTRACT

Methods and apparatus are described which provide secure interactive communication of the text and image information between a central server computer and one or more client computers, located at remote sites for the purpose of storing and retrieving files describing and identifying unique products, services or individuals. Textual information and image data from one or more of the remote sites are stored separately at the location of the central server computer, with the image data being compressed, and the textual information included in a relational database with associated image identifiers. The central computer has the capability for independent management of both image and textual data, to ensure that all information can be independently retrieved. Requests are made from remote terminals to the central server computer, with the capability of processing multiple, simultaneous requests. Upon a request from a remote terminal, textual and associated image data are recalled and downloaded for review. Various forms of data and image formatting may be employed, including encryption techniques to maintain the security of the data. The server computers may be interlaced with other computers, to provide for the capability for entering images associated with financial transactions, so that they may be accessed as permanent records of the system.

6 Claims, 3 Drawing Sheets

SECURE IDENTIFICATION SYSTEM

This is a continuation-in-part of applications Ser. No. 08/205,885, filed Mar. 3, 1994; Ser. No. 08/393,493, filed Feb. 24, 1995; and Ser. No. 08/410,318, filed Mar. 24, 1995, all now abandoned.

FIELD OF THE INVENTION

The present invention relates generally to the field of secure identification systems, and, more particularly, to the communication of digital images from a centralized server computer to a plurality of client data terminals located at remote sites, for the purpose of providing visual identification of subject individuals or product items.

BACKGROUND OF THE INVENTION

Many identification systems are described in the art, and the methodologies of these approaches cover a wide range of techniques. In some cases, a photograph of a subject or his fingerprint pattern is affixed to an identification card, usually as part of a tamper-resistant assembly. In other approaches, various methods are employed for storing image or password information in a magnetic stripe or in an optically encoded image or pattern which is physically part of the identification card. Still other approaches utilize a "smart card" having its own semiconductor memory capability for information storage. Each of these techniques is effective for specific applications, but in each case the security carries a high cost, either in expense for the materials involved, the complexity of the assembly process for the identification card, or the repetitive cost of applying the method to a plurality of individual identification cards utilized for different circumstances. In addition, since a major part of the identification information is carried in the physical identification card itself, it is subject to tampering, alteration, or replication if it falls under the control of an unauthorized user.

SUMMARY OF THE INVENTION

The invention overcomes the limitations of the systems of the prior art by utilizing a separate, centralized database to store data-compressed images of the subject individuals or items, and subsequently downloading the data-compressed images to local data terminals, on demand, at the time of the identification event or transaction. Because the image information is not stored within the identification card itself, it is not subject to alteration or replication by an unauthorized user, and the use of encryption techniques makes the image information useless if the data signals are intercepted. In addition, a plurality of identification cards or customer accounts may be associated with a single image, as, for example, all of the credit cards owned by a single individual, or the checking and savings accounts for an individual. In the case of a credit card, images for both a husband and a wife could be associated with an individual card or a plurality of cards; similarly, an image for a child having authorization to use a card could be associated with that card, and, if desired, could be assigned a different credit limit. The image may include a copy of the authorized signature, or the signature may be provided as a separate image file, which then could be used by the transaction terminal to compare to a scanned image of the signature on the authorization slip or the input of a "pen" computer or pressure-sensitive pad. Additional information, such as the Social Security Number or the mother's maiden name for the cardholder may be used to augment these security measures.

In cases in which a user is to be identified although he or she is not physically present at the transaction terminal, as, for example, when products are ordered by telephone using a credit card, the terminal operator would be able to accomplish a partial identification by using the image to compare the physical appearance in the image to the details supplied by the customer in response to operator questions. Among the suitable characteristics of physical appearance or traits which can be compared are, for example a fingerprint, an eye scan to determine the color of the eyes, hair coloring, weight, identifiable birth marks, the race of the individual and the like. Alternatively, the customer could choose a distinctive image, such as a corporate logo or a picture of an animal or a special article as his confirmation symbol, and the operator would expect the customer to validate his order by describing his confirmation symbol. As a further verification, the customer could be required to key in a personal identification number ("PIN") using his telephone key-pad, which then could be compared to the number stored in the central database for each credit card. In the future, when video-phones become available generally, it will be possible to perform this identification process visually; in addition, the use of "pen" computer units would allow a customer to transmit his authorization signature directly to the transaction terminal.

As image recognition systems become more reliable, many of these visual identification steps may be automated. In this case, it will be desirable to provide video camera facilities at the transaction terminals, so that the image of the purchaser may be captured at the time of the transaction. If desired, such an image could be uploaded to the transaction computer to provide a record of the identity of the purchaser in a particular transaction.

In actual implementation, the image information may be relayed to the transaction terminal through a central transaction computer, such as those utilized by current credit card clearing houses. As an alternative, the image database computer could serve as the gateway to the central transaction computer, by relaying the financial information to the central transaction computer. In this case, it would be somewhat less complicated to maintain a record of the image of the purchaser, as this image database computer would be optimized for image handling and storage.

At the remote transaction terminal location, it would be advantageous to integrate the video display capabilities into a single unit which also provides the data-input and cash-register facilities. Where this is not feasible, an analogous data-communications path would be utilized, with a separate video display unit situated at the transaction terminal location.

In some applications, it may be desirable to provide a local image database, as, for example, of regular customers at a particular retail store. Although this reduces the level of security available, it would speed communications and decrease the on-line time for the centralized computer database. In addition, it would allow verification of the identity of the customer, without the need to communicate with the central database computer.

When implemented in a typical sales operation, image records representing the individual products optionally may be stored in a local database, such that as a product price tag is scanned at the check-out register, an image of the product is relayed from the database computer to the check-out register transaction terminal so that the identification of the product may be verified by visual comparison with the image displayed on the transaction terminal, thereby confirming the accuracy of the scan and preventing a customer from placing the price tag of a less expensive product on a more expensive product.

In a law-enforcement environment, a police officer who has stopped a suspect vehicle could download an identification picture of the registered owner before approaching the vehicle, thereby giving him the advantage of knowing in advance the physical appearance of the presumed driver. For subjects taken into custody, the identifying image would allow rapid identification of the individual, and would inhibit accidental release due to errors in identification. For Immigration Department officials, downloaded images would allow verification of the identity of subjects presenting passport credentials.

In a banking environment, an image of the customer at an ATM terminal could be compared to a downloaded image to verify the identity of the customer. Several systems for automatic image recognition are presently available, with recognition rates varying from 95% to over 99%, depending on the strictness of the comparison.

In a business environment, any type of legal document, such as a contract, may be secured by associating the document with a particular identifying inage, much in the same way as Notary Public procedures are employed today. Images of the principals may be deposited in a special image archive facility, for later retrieval in the event of any dispute.

The original identification images would be entered from a banking institution or a retail site of the entity issuing the identification card. After the subject image has been captured, using either a still video camera, a motion video camera, or a scanned photograph, the image is data-compressed, encrypted, and transmitted to the central image database. Once it has been included in the image database, the image for a particular subject may be associated with as many different identification cards, credit cards, or customer accounts as desired, and made available to any number of transaction computers, which may be representative of a plurality of independent transaction systems. Preferably, a scanned image of the signature of the subject would be included, and associated with the subject image file, along with any other identification data, such as the Social Security Number or a special password.

DETAILED DESCRIPTION OF THE PREFERRED EMBODIMENT

The present invention takes advantage of computer networking, computer-based communication, client-server architecture, and relational databases in order to implement a new and unique system for secure identification and communication. Background information is available through the Bijnagte and Sibley, Jr., references, and also through descriptions of computer network operating systems (such as Novell NetWare, UNIX, or Microsoft Windows NT-Server), for communications protocols (such as TCP/IP or IPX), or for communications links (X.25, ATM, ISDN, or T1/T3 lines).

For the purpose of this disclosure, it should be understood that the term "item" is intended to refer to any product (new or used), service, or person to be listed within the database of this invention, and for which or whom image information is available for display based on a specific request. Broadly, the system may be used in conjunction with individuals or products which may be identified by comparison of the subject item with a pre-existing image previously entered into the central database.

Figure 1:
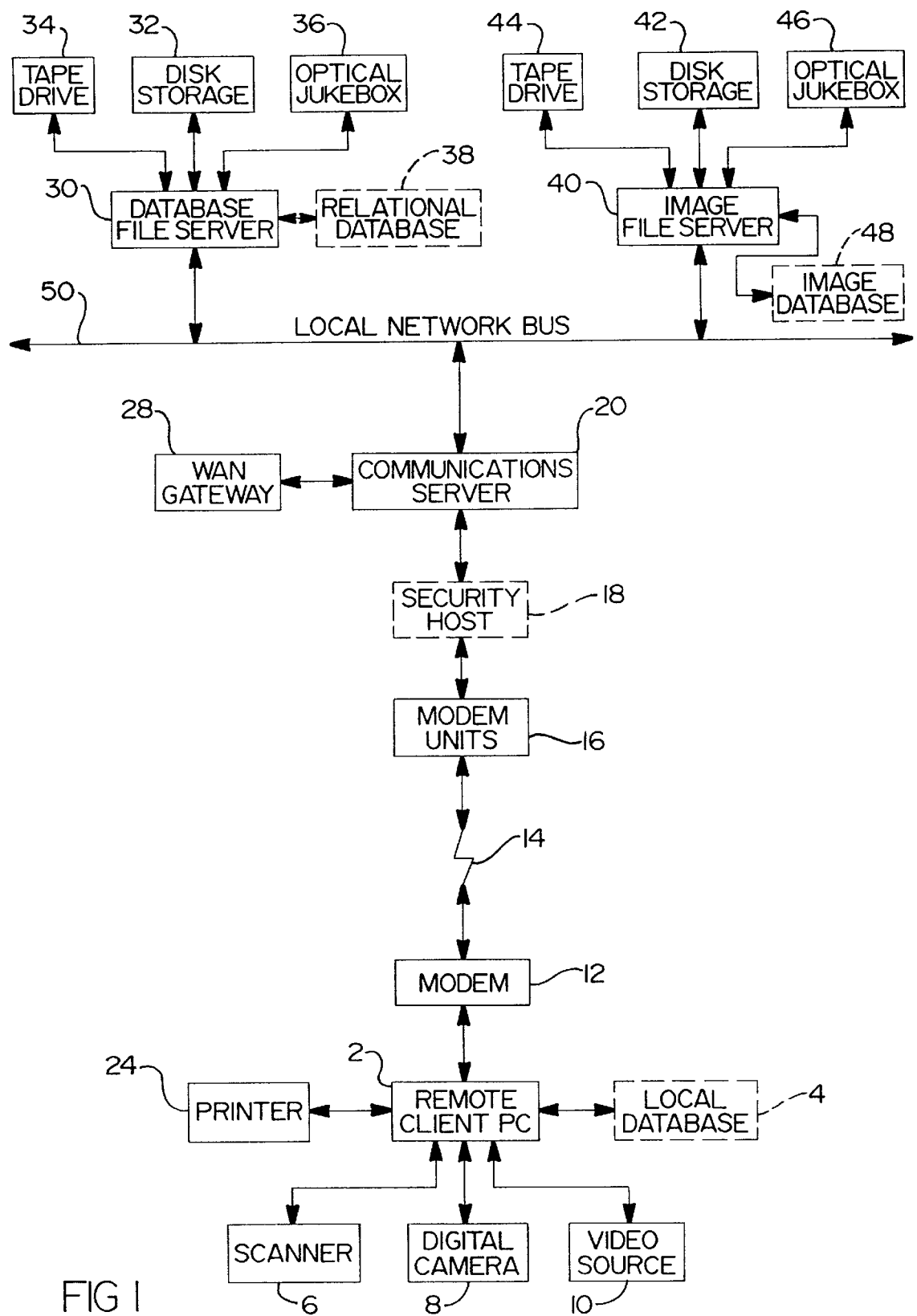
FIG. 1 is a block diagram depicting the hardware components for uploading image identification information in the preferred embodiment.

FIG. 1 shows the organizational structure of one of the typical remotely located clients forming part of a client/server system architecture in accordance with the invention. At the option of the system designers, a personal computer 2 maintains, on its disk storage facilities, a local database 4 of items or people to be listed within the system. As these items, products, or people are identified, the characteristics of each are entered into the local database, employing conventional user interfaces such as the keyboard and "mouse" (not shown) provided with the personal computer.

Images related to these items are then associated with them in the database record, using the photographic image scanner 6 or the digital still-video camera 8. Other possible sources could include analog still or motion video sources 10, providing signals to be digitized by a digitizer-plug-in-board installed within the PC (not shown), or digitized video signal materials provided from other sources. After the images have been input to the PC, they preferably are data-compressed for storage on the internal hard-disk provisions included with the PC, at the option of the system designers; this process is discussed in further detail below. For convenience, a printer 24 is provided to prepare hard-copies of the subject images, including associated images such as the scanned signature of the subject, with or without additional text information.

In many cases, the image of a particular item or individual may be deemed to be useful for local identification, and the manager of the item may choose to keep the item within his local database rather than to list it on the central database, thereby providing information for local use or to decrease the duration of transactions by eliminating the need to download the image of a subject. In this case, no further steps will be required, as there is no communication with the central database computer. However, if the item is to be listed on the central database, the following steps are executed.

The client PC 2 is equipped with a modem 12 for data communication to the central database computer over telephone lines 14. Typically, this modem will be capable of operation at least at 14.4 KBaud; however, 28.8 KBaud or faster modems, dedicated communication links, or ISDN (Integrated Services Digital Network) communication links may be implemented, with progressively higher performance. This communication link 14 is connected via one of a plurality of available modems 16, or by appropriate communication link or ISDN service, to a network-remote-node communications server 20. Hardware to effect this type of communications link at the communications server site is readily available from manufacturers such as Digi International or USRobotics.

As an alternative to modem 16, connection to this communications server may be achieved via a wide-area-network (WAN) access provider, such as an Internet access provider, through appropriate network gateway hardware 28. In such a case, the gateway communications link may be implemented via ISDN lines, dedicated communications lines, T1/T3 service, or satellite links. In alternative implementations, the network gateway hardware and communication link may be implemented at a different point in the server site, such as in a device directly connected to the local network bus 50 (described herein below) or as interfaced directly to the database file server 30 (described herein below). Where a network of server sites is implemented, this communication link, or a separate similar link (not shown), would enable the various server sites to communicate with each other, or with other computer facilities outside of the network. In practice, a plurality of communications servers may be required at each site, depending on the capabilities of the communications server hardware 20, the number of simultaneous active clients to be served, and the type of communication links established by the clients.

Upon log-on by the client PC, the communications server 20 preferably first authenticates the user by way of known security measures included in typical multiple-access computer systems, and optionally may also verify the Caller ID signal transmitted by the telephone system, as currently available in most communities throughout the United States. Alternatively, the communications link path may include a "security host" computer 18, such as the model ACM 400 offered by Security Dynamics, interposed between the modem 16 and the communications server 20. This computer checks for the presence of a particular hardware security key installed at the client PC, as further described below in reference to FIG. 3. Upon authentication, any updates in software may be downloaded automatically to the client PC. In some cases, it may be necessary to check the client PC to confirm the presence of certain hardware, or to verify that a correct version of software is currently in use. This may be determined by way of specialized systems management software available for many network operating systems, or by programming the client PC to automatically provide this information to the communications server as part of the log-on procedure.

The communications server is connected to a local network bus 50, which may be implemented using any of the many well-known architectures, including Ethernet, Fast-Ethernet, or Token-Ring. Also connected to this network bus is the database file server 30, which maintains the database records and manages the inage storage processes. The database file server is equipped with a Random Array of Inexpensive Disks (RAID)-based mass-storage system 32, which holds all the data records in the central relational database 38. In addition, this server system includes a tape-drive back-up unit 34, and optionally may include provisions for an optical-disc "jukebox" unit 36 to extend data storage capabilities. Networks of this type are compatible with various operating systems, including UNIX, Novell NetWare, or Microsoft Windows NT-Server, although the system selected should support access for multiple remote clients.

Images associated with the relational database 38 are stored on an image file server 40, also connected to the network bus 50. This file server is equipped with a RAID-based mass-storage system 42, which holds all the image records in the image database 48. In addition, the image server is equipped with a tape-drive back-up unit 44, which optionally may include provisions for its own optical-disc "jukebox" unit 46 to extend image storage capabilities.

For data entry, the descriptive records for the specific items are stored in the relational database file server 30, while the associated images are uploaded for storage on the image file server 40. In operation, the storage locations of the associated image files managed by the image file server are referenced by the database file server, and provided as requested by the client through the communications server 20. The actual images may be stored as "pages" within an image compilation file, and may include one or more "thumbnail" or reduced-size images, which may or may not be illustrative of particular full-size images, and which may be transmitted quickly to give an overview of the item. Alternatively, the images could be organized with a primary image file (with or without an associated reduced-size image) and a secondary image file containing multiple image pages, with or without reduced-size images. In the latter situation, the user would first request the download of the primary image file for an item, and then, if desired, would have the option of also downloading the secondary image file, in order to obtain further information about that particular item. All data files and images files are held in the active (RAM) memory, or off-loaded to the local hard-drive of the client PC, so that they may be reviewed and compared by the operator as desired, without further communication activities. In client PCs having multi-tasking capabilities, the downloading process may continue as a background task, while the operator examines the material that has already been received and, as necessary, decrypted, as a foreground task. In this way, the operator need not wait until all of the data has been downloaded before beginning the examination of the materials transmitted.

In a typical operation, the client will upload information relating to specific items, which then are stored by the database file server. Based on the item storage by the database file server, the client then may request that selected images be uploaded to the image file server. This technique allows each of the system components—communications server, relational database file server, and image file server—to be optimized for its specific application. However, depending on the particular application, database size, and communications traffic, one or more of these functions may be combined, such that in some cases a single server system may provide all of the required functions. In other cases, multiple servers may be required for one or more of these functions, each of them connected to the local network bus 50.

Figure 2:
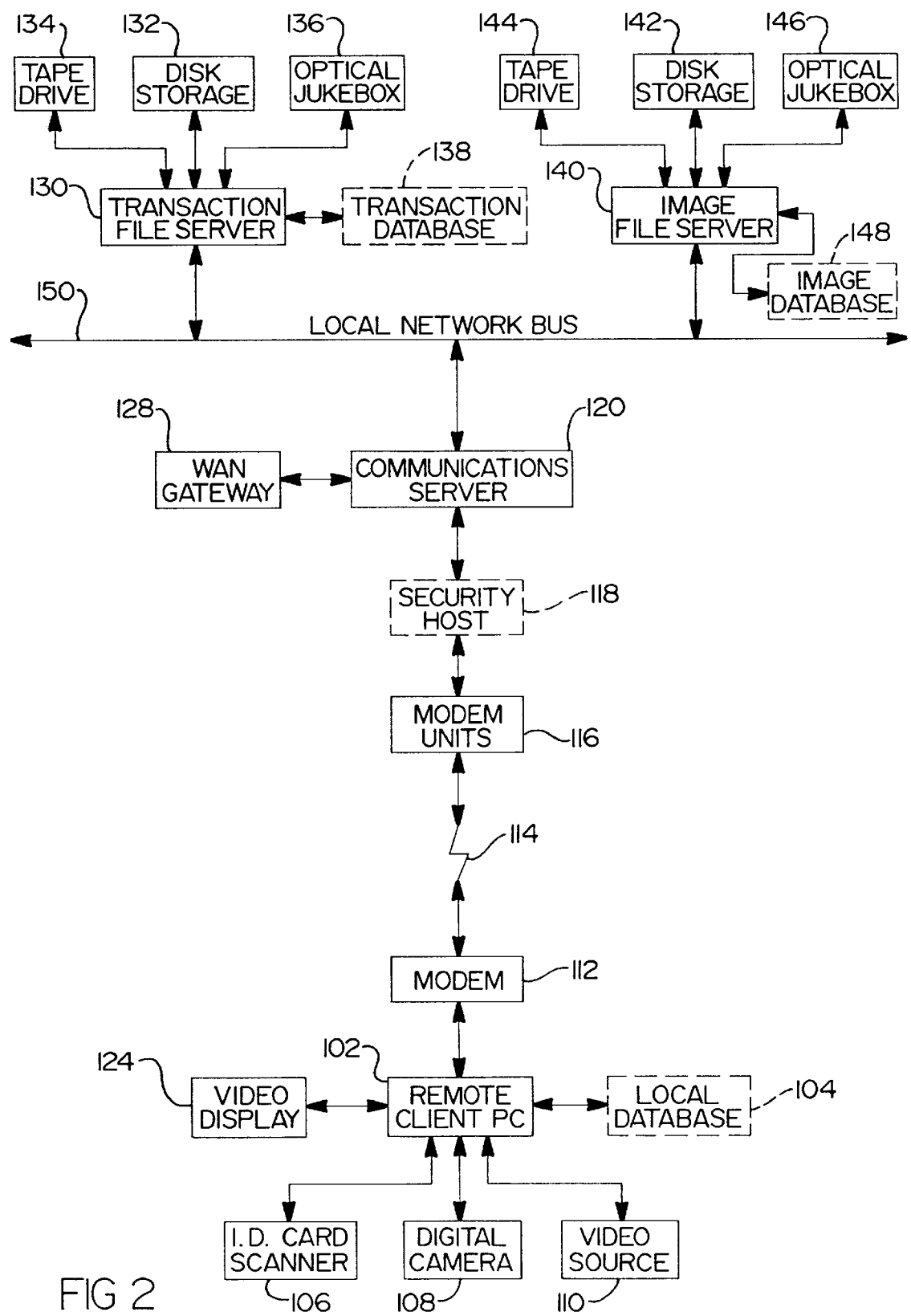
FIG. 2 is a block diagram depicting the hardware components for downloading image identification information in the preferred embodiment

The steps involved in an identification event or transaction will be understood with reference to FIG. 2. In many respects, the system architecture is equivalent to that of FIG. 1 except that the flow of image file information generally is in the opposite direction. It will be appreciated that many of the details of the data communications and system architecture will function in identical ways, and therefore the reader is referred to these discussions herein above. In a typical identification event, a subject will present an identification card (I.D. card) for verification at the event site. The actual scanning device 106 may be implemented as a magnetic stripe reader, optical reader, or pattern recognition unit. This scanning device will retrieve identification information from this I.D. card which is representative of the subject, and communicate it to the transaction terminal 102. In practice, this unit may be as simple as a credit card reader, or as complex as a PC which is part of a sophisticated computer network. For the purpose of this discussion, the function of the transaction terminal will be explained with the understanding that it is a remote client PC to the central database server.

The remote client PC 102 may be utilized as part of a product UPC-code scanner or optical character reader system which interprets product tags. As an option, a local database 104 may be maintained on this PC, such that when a particular product tag is scanned, an image of the correct product item is presented on the video display 124. In an alternative implementation, this database would maintain identification images of the subjects, such as images of regular customers at a bank or retail store. When any input of product information has been completed, the primary identification event or transaction may be effected. In a banking environment, this could be part of a financial transaction, such as an account deposit or withdrawal; in a retail operation, this would correspond to a credit card transaction or a payment for goods by check. When the I.D. card is scanned, the information is communicated through the modem 112 to the telephone line or communications link 114 and on to one of a plurality of modem units 116. As explained herein above, the system optionally may include a security host computer 118 interposed between the modem 116 and the communications server 120.

The communications server 120 is connected to a local area network 150, typically implemented using one of several forms of Ethernet. Also connected to this network bus is a transaction file server 130, which maintains a transaction database 138 containing information used to identify any verification passwords and the storage locations of the associated image files. This transaction file server is equipped with a RAID-based disk storage unit 132 and a tape drive 134 for data back-up. As an option, this server also may be equipped with an optical-disc jukebox 136 for additional storage capacity.

Images associated with the relational database 138 are stored on an image file server 140, also connected to the network bus 150. This file server is equipped with a RAID-based mass-storage system 142, which holds all the image records in the image database 148. In addition, the image server is equipped with a tape-drive back-up unit 144, which optionally may include provisions for its own optical-disc jukebox unit 146 to extend image storage capabilities.

In response to an identification event or transaction, the client PC will download information related to the subject, which previously has been stored on the database file server. In addition, the client then may download selected images from the image file server, including both identification images and also associated images, such as images of the signature of the subject. This technique allows each of the system components—communications server, relational database file server, and image file server—to be optimized for its specific application. However, depending on the particular application, database size, and communications traffic, one or more of these functions may be combined, such that in some cases a single server system may provide all of the required functions. In other cases, multiple servers may be required for one or more of these functions, each of them connected to the local network bus 150. In addition, depending on the overall architecture of the system, the various communication servers 20 and 120, and file servers 30, 40, 130, and 140, may be combined or separated as necessary to match the demands of the communication load, convenience, economy, or the like.

It is anticipated that in some cases the client PC or transaction terminal will not have the required windowing capabilities, and will only process textual information. In these cases, there will be no uploading or downloading of images to this client, and all database services will be confined to the relational database file server.

In some applications, it may be necessary to control the access to the databases, so that certain clients may upload items for inclusion into the database, but downloading to certain other clients is prohibited, or restricted to specific clients (such as government authorities or police units) for reasons of security or privacy, as discussed below.

Figure 3:
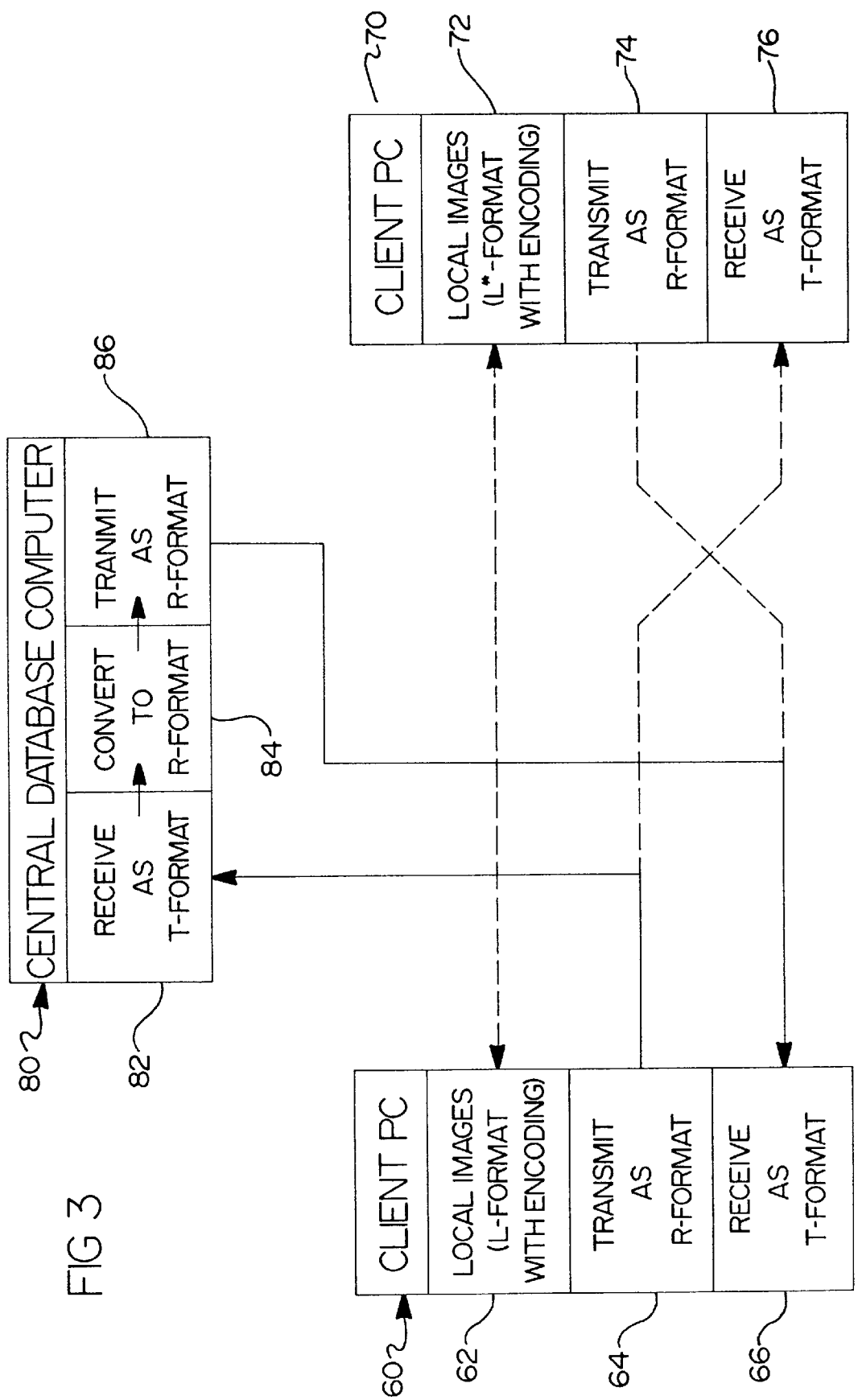
FIG. 3 is a block diagram depicting the various formats of image data compression utilized for local data security and for the control of the transmission of images between remote sites.

FIG. 3 shows the inter-relationship between the various file formats for images stored locally at client PCs, transmitted to or from the server image database, or transmitted between remote client sites. A client PC, shown generally at 60, optionally may maintain a local database 62 which includes image files associated with particular items. These files are encrypted by any of several available techniques, including commonly utilized formats for data encryption or by custom modification or encryption of the file header information so as to link the files themselves with the password character sequence contained inside a hardware security key. In typical usage, this hardware key consists of a limited number of storage cells in an EEPROM, which have been programmed with a unique sequence of characters. Only a computer having this particular security key attached to the parallel interface connector is able to decrypt the image files and reconstruct the image; this encrypted format is designated as the "L" or "Local" format for the purposes of this discussion.

In practice, the actual data compression methods employed could include the industry standard JPEG format, Lead Technologies "cmp" format, Iterated Systems "fractal compression", "wavelet compression", or other proprietary or commercially available techniques. Compression ratios on the order of 30:1 or more preferably are employed, thereby producing image files of approximately 10 KBytes or smaller in size. It would be particularly advantageous to utilize a compression technique which is resolution-independent (such as fractal compression) which produces very compact image data files that may be re-sized to match the video display interface hardware in the client PC. In addition, selected image files 64 to be transmitted to the image file server and designated as "T" or "Transmitted" format are created by modifying the internally stored L-format files, utilizing formatting methods similar to those discussed above for encrypting without hardware security keys. Alternatively, the use of "public" keys with "private" keys may be implemented, as well established in the art of secure encrypting of data transmissions, and following standards such as the DES (Data Encryption Standard) developed for the U.S. Government, or the MD5 system offered by RSA Security, Inc. Similarly, image files 66 received from the image file server are encrypted in "R" or "Received" format, which is distinct from either the "T" format or the local "L" format. These files are decrypted upon receipt, and may be converted into the normal L-format utilized for the local client PC database.

A second client PC is shown generally at 70. This second client PC also may maintain a local database, but, because of the security techniques described herein above, the image file storage format is distinct from the format of the first client PC, and is designated as L*. In addition, the second client PC has provisions for transmitting, receiving, and converting image files in the R and T formats described in reference to the first client PC.

If an attempt is made to transmit or transfer a file directly from one client PC site to another (or to a client PC not legitimately a part of the system), the images will be unusable, because the L-format images cannot be decrypted by an L*-format client PC, or any other PC which does not have the proper hardware security key, and none of the Client PCs has provisions for converting T-format images into usable form. In order to allow files to be exchanged and viewed by other client PCs or users, the image file server, shown generally at 80, will perform this conversion step. Image files transmitted by client PCs in T-format are received at step 82, and are converted at step 84 to the R-format. At this time, files optionally could be converted from one image data compression scheme (for example, by LEAD Technologies) to a different image data compression scheme (for example, fractal compression by Iterated Systems) to save local storage space and communication costs and time during image downloading procedures. In many cases, sophisticated hardware-assisted image processing (such as the step of fractal image compression) are expensive to implement on a client-PC-wide basis, but would be economically feasible at a central database site. At step 86, the R-format image files may be transmitted to any other client PC site on the network. It should be understood that the image files may be stored in T-format and converted at the time of transmission, or converted to R-format at time of receipt and storage; alternatively, the files may be stored in a third format which may be incompatible with either R- or T-format files. FIG. 2 indicates compatible image file transmissions as solid lines, and incompatible image file transmissions as dashed lines.

Many possible applications in identification of people will readily be appreciated, including secure identification for credit card, check-writing, ATM, or other financial and retail transactions; identification for law-enforcement or Immigration-control agencies*; and any activity for which positive identification is essential, including those activities for which Notary Public services currently are employed. For retail applications, product images retrieved from a local or global database may be used by sales clerks to verify the pricing or attributes of a particular item, by making this information available at checkout-cashiers' stations, or at customer service stations throughout the store. In addition, many of the human identification services to be performed may be automated, using computer-based image recognition techniques, such as the Photobook system offered by Facia Reco Associates, or the TrueFace system offered by Miros. Based on the stringency of the testing criteria, recognition rates for these systems in different applications varying from 95% to 99.9% have been achieved.

*identification of patients in a medical environment;

Having thus described the invention, I claim:

1. A secure identification method, the method comprising the steps of:

capturing a first graphical representation of a subject, the representation being at least one physical trait selected from the group consisting of a fingerprint, facial image and signature at a first data terminal;

transferring the first graphical representation of the subject to a centralized computer located remotely from the first data terminal;

receiving the first graphical representation of the subject at the centralized computer, and compressing and storing information representative of the subject in a relational database according to a standard compression format at the location of the centralized computer;

associating the at least one selected representation with at least one computer activation datum, which when activated allows access to the database;

receiving a request from a user at a second data terminal requiring authentication, the second data terminal being located remotely from the centralized computer;

inputting, at the second data terminal, a second graphical representation of the user, the second graphical representation being at least one of the captured first representations;

activating the centralized computer with an activation card to download stored information from the centralized computer, the activation card only possessing activation means, the card not possessing either the first or the second graphical representation of the subject;

downloading from the centralized computer information representative of the previously stored first graphical representations;

comparing, at the location of the second data terminal, the first and second graphical representations; and authenticating the user if the first and second representations are substantially the same.

2. The method of claim 1, wherein the second data terminal is the first data terminal.

3. The method of claim 1, wherein the subject is an inanimate subject.

4. The method of claim 1, further including the step of storing, at the first data terminal, a database of subject graphical representations for the purpose of making localized comparisons.

5. The method of claim 1, further including the step of storing local databases of subject graphical representations at each of a plurality of remote data terminals, each database being encrypted so that a particular data terminal cannot interpret the database of another.

6. The method of claim 1 wherein the compression format is selected from the group consisting of JPEG, cmp, fractal compression, or wavelet compression.

* * * * *